United States Patent
Szyms (10) Patent No.: US 7,404,712 B2
(45) Date of Patent: Jul. 29, 2008

(54) MULTIPLE SEGMENT MOLD TO MANUFACTURE TIRE BLADDERS

(75) Inventor: Walter Szyms, Boca Raton, FL (US)

(73) Assignee: Carlisle Intangible Company, Syracuse, NY (US)

( * ) Notice: Subject to any disclaimer, the term of this patent is extended or adjusted under 35 U.S.C. 154(b) by 99 days.

(21) Appl. No.: 11/550,188

(22) Filed: Oct. 17, 2006

(65) Prior Publication Data

US 2008/0088062 A1   Apr. 17, 2008

(51) Int. Cl.
*B29C 33/42* (2006.01)
*B29C 33/44* (2006.01)

(52) U.S. Cl. .................. 425/437; 425/438; 425/443

(58) Field of Classification Search .................. 425/52, 425/556, 437, 438, 441, 443
See application file for complete search history.

(56) References Cited

U.S. PATENT DOCUMENTS

| | | | |
|---|---|---|---|
| 3,459,849 A | 8/1969 | De Rond | |
| 3,806,288 A | 4/1974 | Materick | |
| 3,914,367 A | 10/1975 | Himmelman | |
| 4,025,269 A | 5/1977 | Reinders | |
| 4,082,490 A | 4/1978 | Chateau | |
| 4,462,850 A | 7/1984 | Fukunaga et al. | |
| 4,531,902 A | 7/1985 | Stuhldreher et al. | |
| 4,954,074 A | 9/1990 | Cohen | |
| 5,062,781 A * | 11/1991 | Szyms et al. | 425/52 |
| 5,221,510 A | 6/1993 | Kassaw, Jr. et al. | |
| 5,256,350 A | 10/1993 | Franzini et al. | |
| 5,310,518 A | 5/1994 | Franzini et al. | |
| 5,346,378 A | 9/1994 | Kassaw, Jr. et al. | |
| 5,403,174 A | 4/1995 | Ushikubo et al. | |
| 5,468,140 A | 11/1995 | Hoffman et al. | |
| 5,658,512 A | 8/1997 | Nobata et al. | |
| 5,693,160 A | 12/1997 | Kawabata et al. | |
| 6,238,193 B1 | 5/2001 | Bosseaux | |
| 6,290,810 B1 | 9/2001 | Yovichin et al. | |
| 6,571,845 B1 | 6/2003 | Caretta et al. | |
| 2003/0042656 A1 | 3/2003 | Fike | |
| 2004/0207116 A1 | 10/2004 | Girard et al. | |

* cited by examiner

*Primary Examiner*—James Mackey
(74) *Attorney, Agent, or Firm*—Wood, Herron & Evans, L.L.P.

(57) ABSTRACT

A mold for forming a tire curing bladder. The mold has an outer mold assembly enclosing an inner mold core assembly. The outer mold comprises three sections and the inner mold comprises two portions. The outer mold and the inner mold core form a mold cavity therebetween. In one embodiment, the mold cavity defines a frog eye geometry where a cylindrical space is formed having a diameter that is greater for portions of the cylindrical spaced away from a centerline of the mold cavity than for portions near the centerline.

11 Claims, 7 Drawing Sheets

MULTIPLE SEGMENT MOLD TO MANUFACTURE TIRE BLADDERS

TECHNICAL FIELD OF THE INVENTION

The present invention is directed to a mold for forming bladders used in the manufacture of tires, more particularly, but not exclusively, to a multiple segment mold for forming tire bladders having a generally cylindrical shape with top and bottom portions having a diameter somewhat larger than the central portion.

BACKGROUND OF THE INVENTION

Tire manufacturing generally involves two basic steps. The first step is building the tire that is yet to be cured into what is termed a "green tire." Commonly, a "green tire" is made by forming an inner liner and then applying first and second plies or belts around the liner, and then placing a tread overtop the second ply. The second step is to cure the green tire in a tire curing press. The combination of these layers results in a green tire ready for insertion into a tire curing press. The tire curing press includes a toroidally shaped mold that has the desired tread imprinted along the inner toroidal interior space. The green tire is placed inside of the tire curing press and a bladder is placed inside of the green tire. When the bladder is inflated, the green tire is pressed against the inner surface of the tire mold, which is heated to melt and bond the different components of the green tire together.

The most common type of tire curing presses and bladders used are Bag-O-Matic (B.O.M.) type. The bladders have a generally barrel shape with a large empty area inside the center of the bladders, which allows the bladder ends to be clamped to a centerpost column inside of the curing press. The centerpost column operates to stretch the bladders for insertion into a green tire. Further, movement of the centerpost column during the curing process causes the bladders to bow outwards and using steam, water, or gas to inflate the bladder. In the traditional design of the tire curing bladders, the center section of the barrel is larger in diameter than the top and bottom sections of the barrel. These bladders are effective for forming tires having a generally round interior profile.

Tire bladders are fabricated in molds in which the bladder material, such as butyl rubber, is injected into a mold cavity and then allowed to cool. Although the design of bladder molds varies, they generally incorporate a number of common features. The molds generally have outer and inner sections in which the outer section is split into top and bottom portions. After the bladder has been cured and cooled, the top portion of the outer section can be removed and the inner portion can be raised to remove the bladder from the mold. The existing molds are well suited for producing standard types of bladders having a center section that is greater in diameter than the adjacent outer sections.

Currently, however, the demand for alternative types of tire designs is increasing. A tire bladder having a profile known as a "frog eye" is gaining in popularity. A "frog eye" bladder is one where the diameter of the bladder is greater along the shoulder ends of the bladder than at the center section. This configuration leads to a bulging of the upper and lower ends of the cylindrical barrel that generally resembles the bulging eyes of a frog.

The existing bladder molds suffer from many drawbacks in producing these new types of bladders. For example, the existing bladder molds are generally designed to produce a bladder having a center section with a larger diameter than the ends. In addition, the three component design of a two-part outer section and an essentially one-piece inner section of existing bladder molds are ill-suited to the manufacture of a bladder having the "frog eye" geometry.

Accordingly, there is need for an improved bladder mold for the manufacture of "frog eye" geometry bladders.

SUMMARY OF THE INVENTION

One aspect of the invention is directed to a tire curing bladder forming mold assembly. The tire curing bladder forming mold assembly is comprised of an outer mold and an inner mold core. The outer mold is in turn comprised of removable and stackable top, middle and bottom sections. The removable top section rests upon the removable middle section, which in turn, rests on the removable bottom section. The inner mold core, which is enclosed within the outer mold, is comprised of two stackable portions; a removable inner mold core top portion which is supported on an inner mold core bottom portion. When assembled, the outer mold and the inner mold define a mold cavity having a centerline and a diameter away from the centerline that is greater than the diameter at the centerline.

Another aspect of the invention is directed to a mold for fabricating bladders having a diameter position spaced from the centerline of the bladder that is greater than the diameter of the bladder at the centerline. The mold comprises a three component outer mold enclosing a two component inner mold core. The outer mold and the inner mold core define a toroidal mold cavity therebetween having a larger diameter at the upper and lower ends of the mold cavity than a diameter at a centerline of the mold cavity.

A further aspect of the invention is a method of forming a tire bladder. The bladder mold comprises an outer mold having top, middle, and bottom sections and an inner mold core having a top and bottom portion with the outer mold and inner mold core forming a mold cavity therebetween. The method comprises the steps of injecting material to form the tire bladder into the mold cavity, curing the material inside the bladder mold, raising a top mold section of the outer mold, lifting a top core portion of the inner mold core, and raising a middle mold section of the outer mold. The method also includes the step of removing the formed tire curing bladder from the bottom portion of the inner mold core.

DETAILED DESCRIPTION OF THE ILLUSTRATED EMBODIMENTS

Figure 1A:
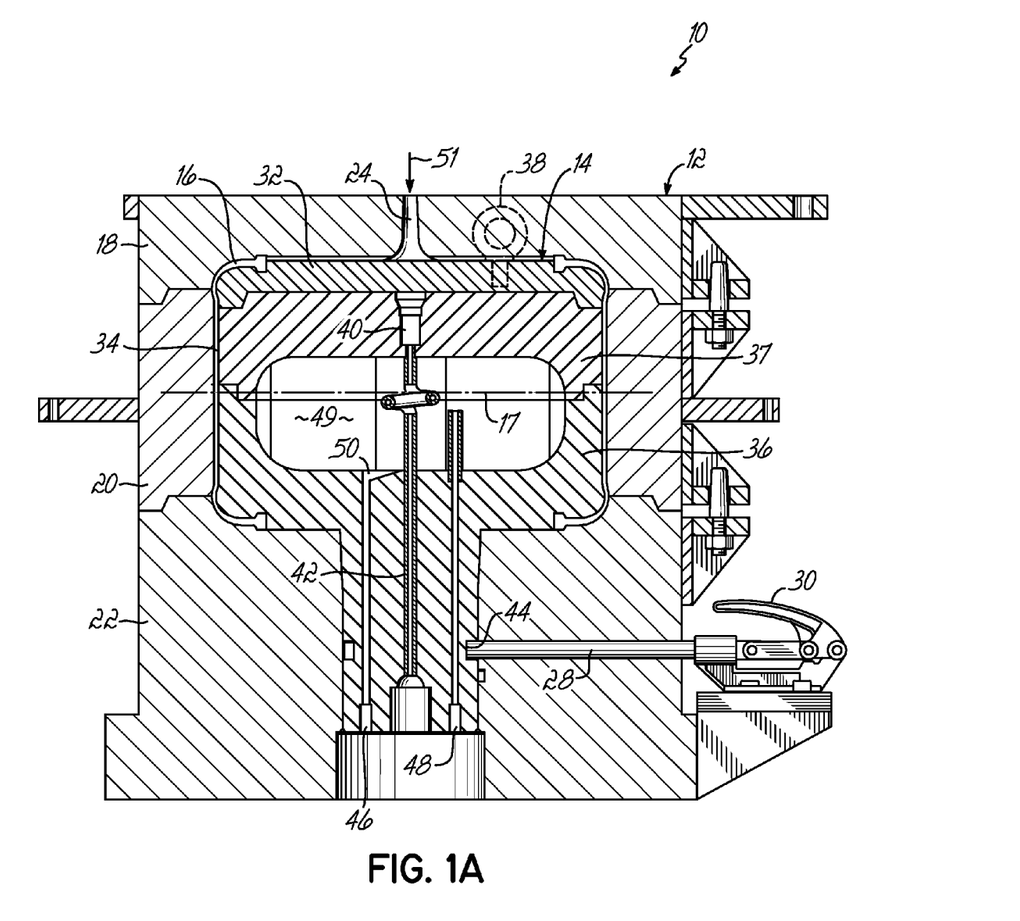
FIG. 1A is a cross-sectional view of a tire bladder forming mold according to one embodiment of the invention.

FIG. 1A illustrates a mold 10 that fabricates bladders for use in a tire curing process. The mold 10 generally comprises a three-sectional outer mold 12 that encloses a two portion inner core mold 14. A toroidal mold cavity 16 is defined between the outer mold 12 and the inner core mold 14 and has a centerline 17. The mold cavity 16 is filled with material to fabricate a tire curing bladder during operation of the mold 10. After the bladder is formed inside the mold 10, portions of the outer mold 12 are removed releasing the formed bladder from the inner core mold 14.

The outer mold 12 is comprised of three primary components; a top section 18, a middle section 20, and a bottom section 22. The inner mold core 14 is also further comprised of two primary components; a top portion 32 and a bottom portion 34 having a bulbous upper end 37 integrally formed with a more narrow lower end 36. The top section 18 of the outer mold 12 overlies the inner mold core 14 and forms the outer top surface of the mold cavity 16 and a portion of the upper "frog eye" of the mold. An injection path 24 is formed in the top section 18 that is in communication with the mold cavity 16 for injection of the bladder material into the cavity during the molding process. The middle section 20 of the outer mold 18 surrounds the majority of the upper end 37 of the bottom portion 34 of the inner mold core 14 and forms the outer surface of the majority of the mold cavity 16 that lies between the "frog eyes" of the mold. The bottom section 22 of the outer mold 18 surrounds the lower end 36 of the bottom portion 34 of the inner mold 14, underlies the bulbous upper end 36 of the bottom portion 34 and forms the outer bottom surface of the mold cavity and a portion of the lower "frog eye" of the mold. A locking mechanism 28 having a handle 30 is inserted through an opening in the bottom section 22 to engage the lower end 36 of the bottom portion 34 of the inner mold 14 to hold the inner mold in position during the molding process as further described below. The top section 18 rests on, and is releasably supported by, the lower section 22. The lower section 22 rests in an injection press or can be supported by any appropriate structure.

Figure 1B:
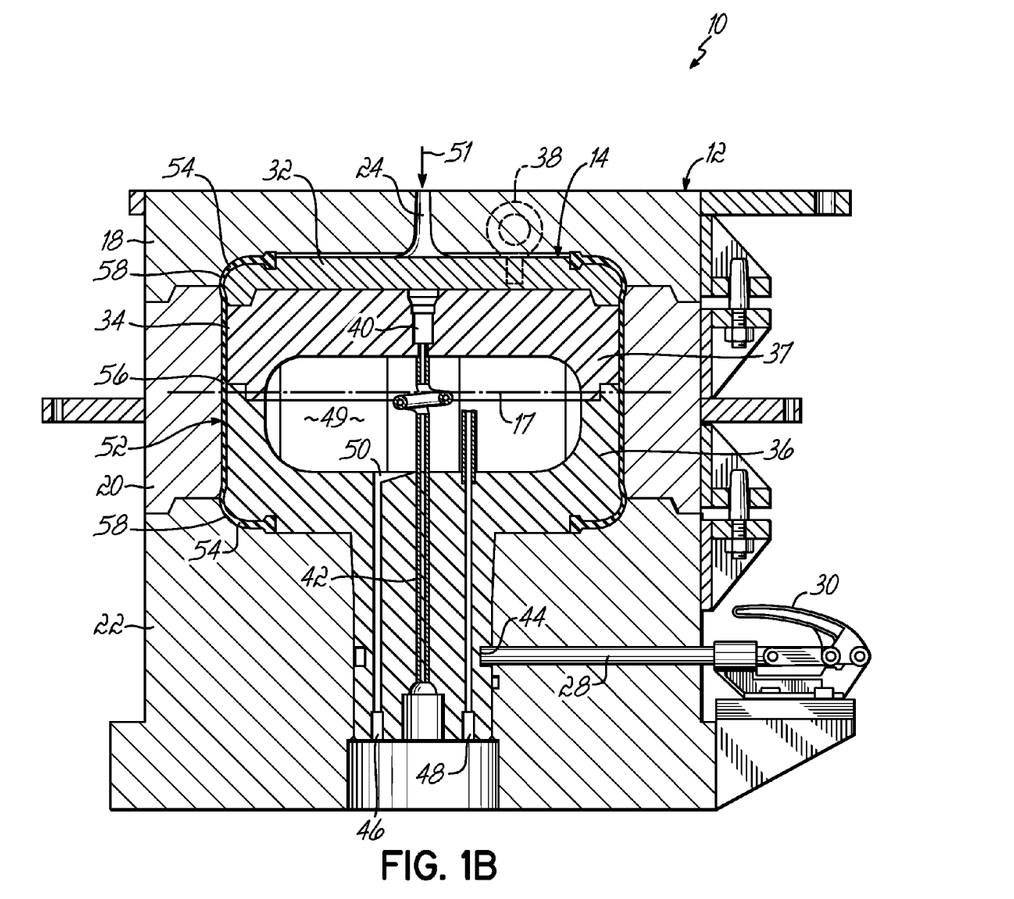
FIG. 1B illustrates the tire bladder forming mold of FIG. 1A after material has been injected therein to form a tire curing bladder.
Figure 1C:
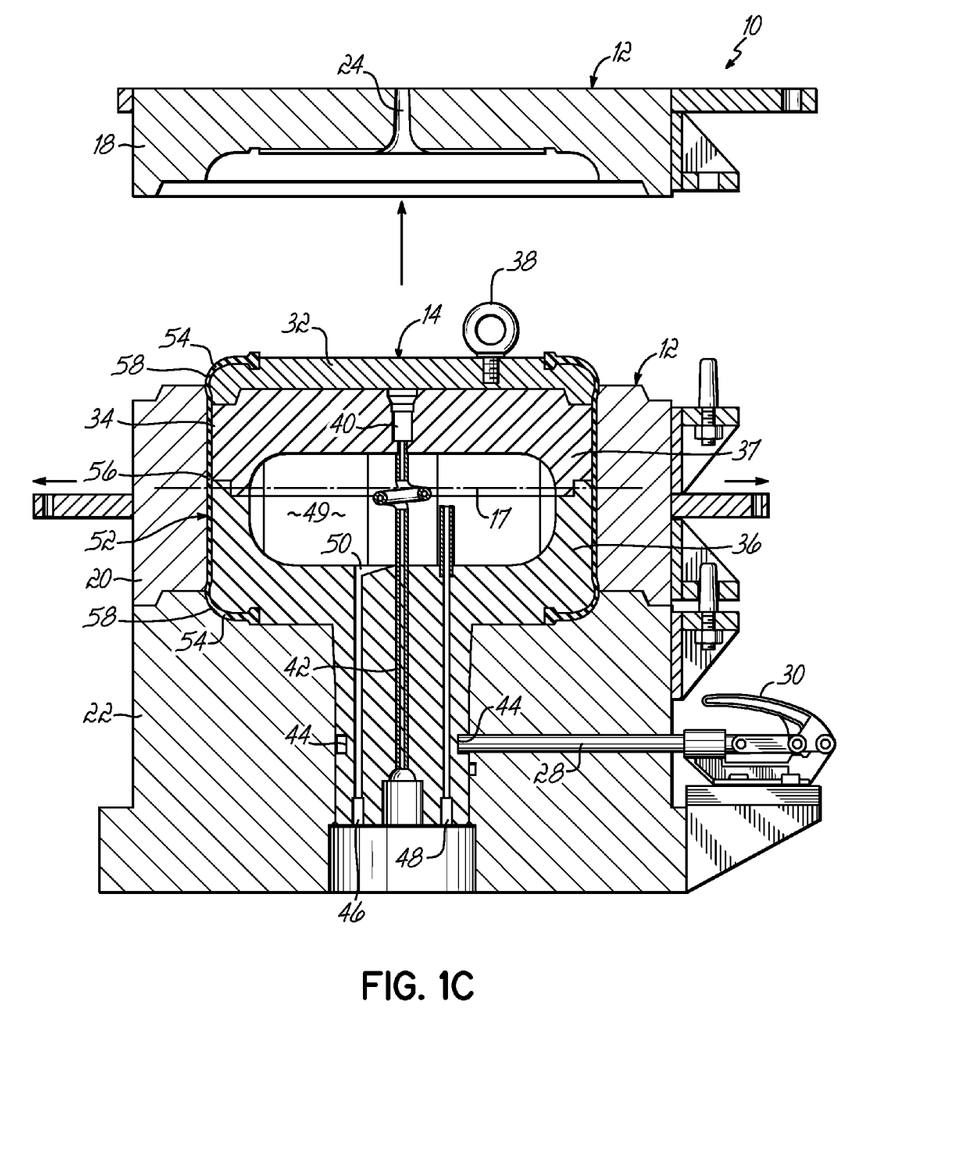
FIG. 1C is an illustration of the cross-section of the tire bladder forming mold of FIG. 1B with the top section of the outer mold removed.
Figure 1D:
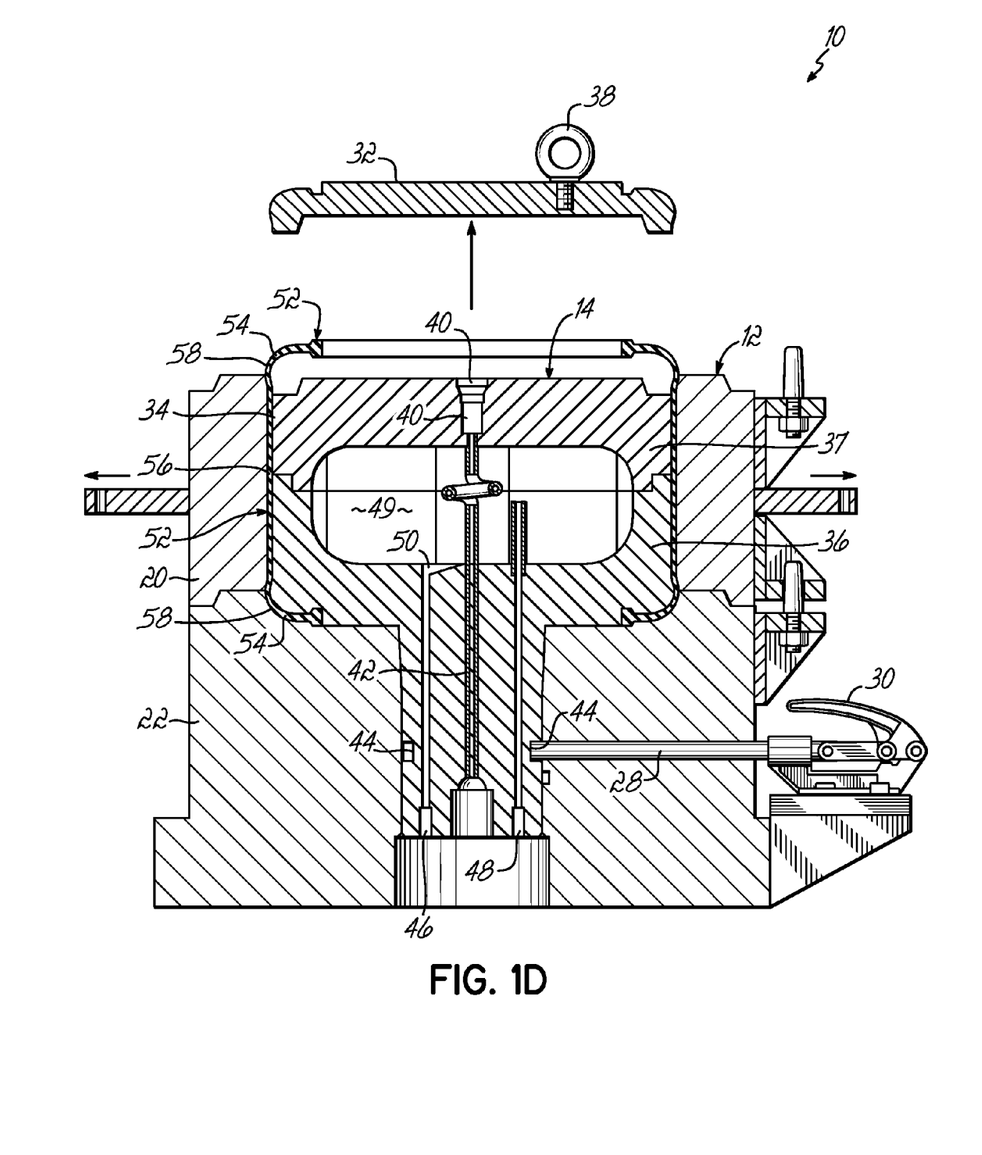
FIG. 1D is an illustration of the tire bladder forming mold of FIG. 1C with the top portion of the inner core mold removed.
Figure 1E:
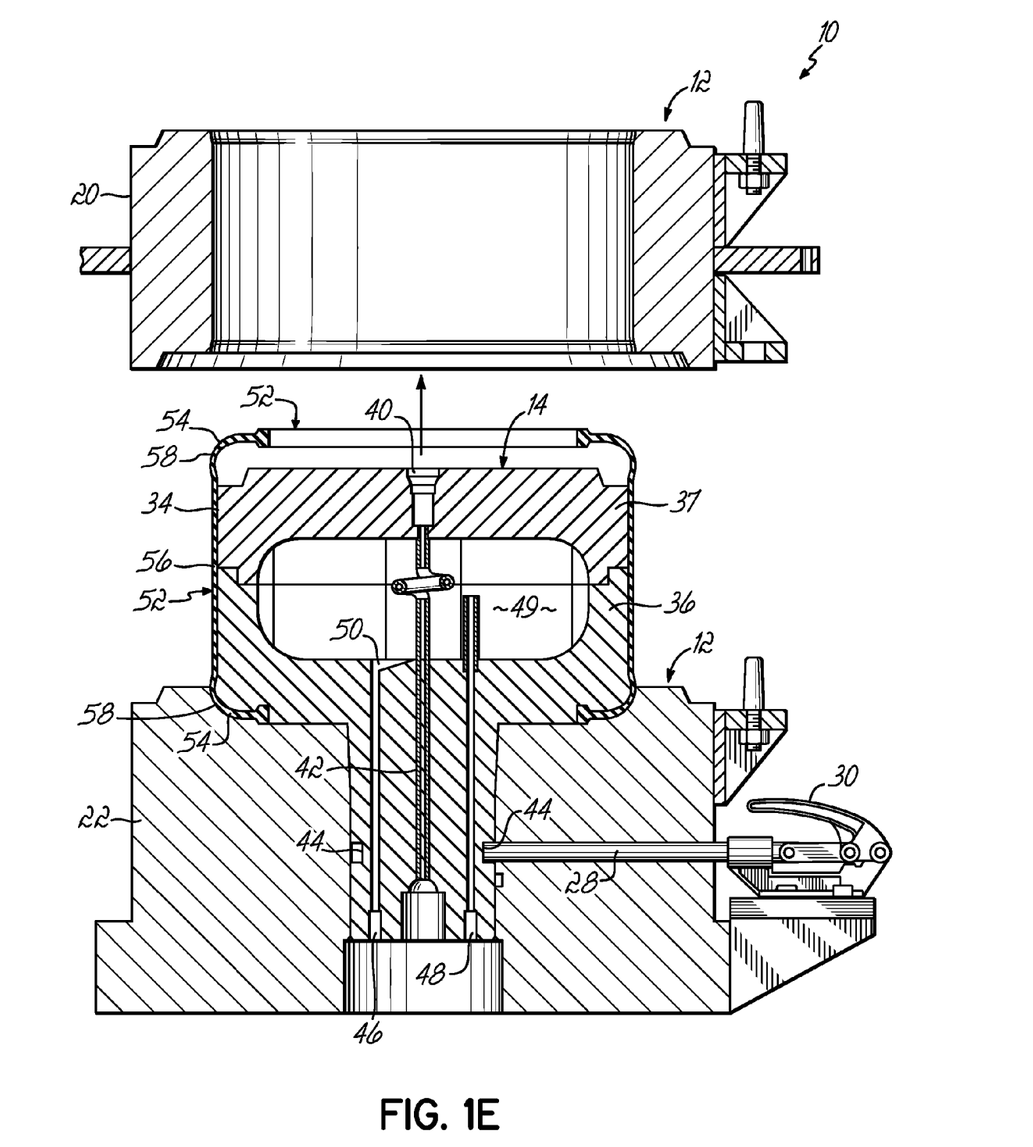
FIG. 1E is an illustration of the tire bladder forming mold of FIG. 1D with the middle section of the outer mold removed.
Figure 1F:
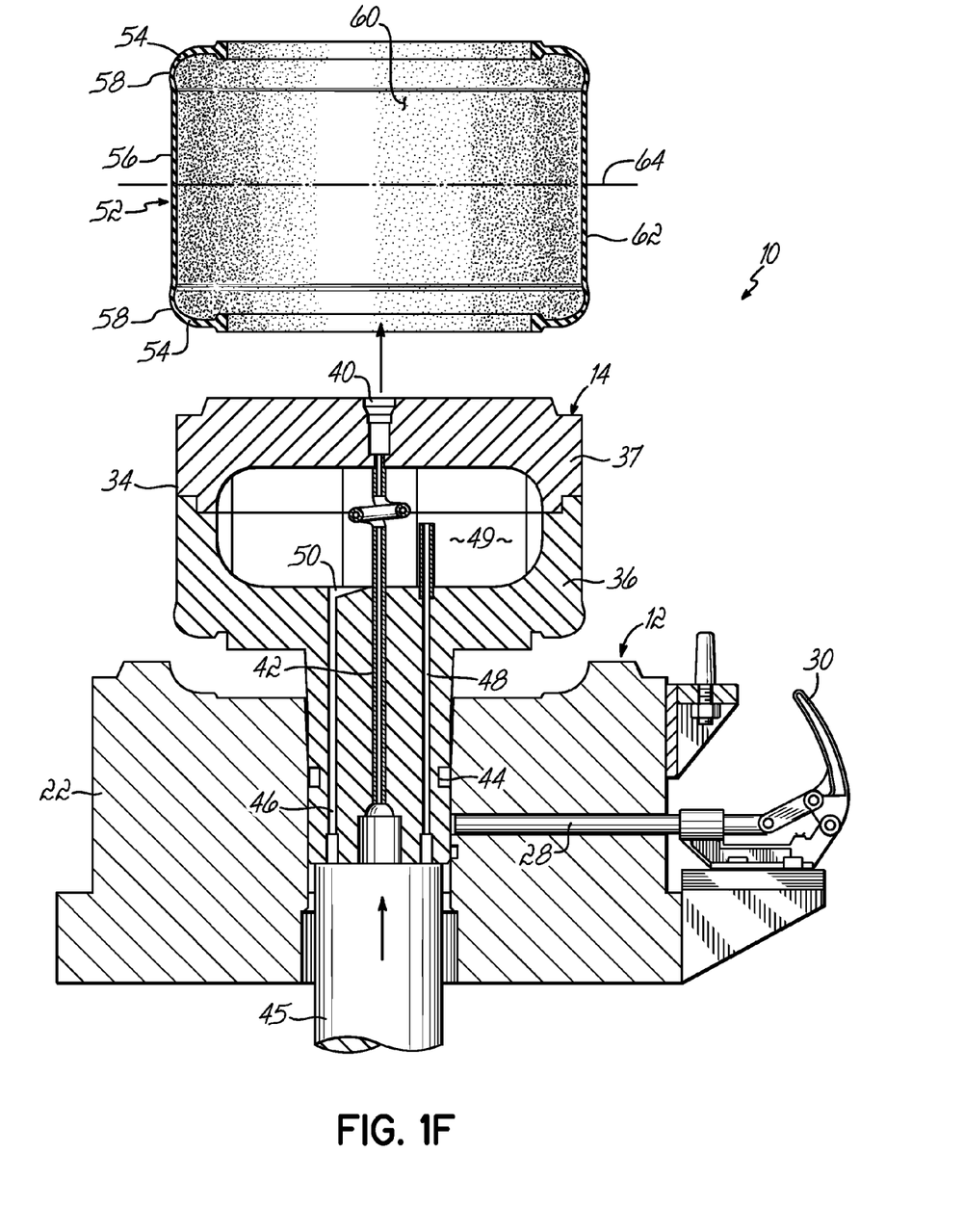
FIG. 1F is an illustration of the tire bladder forming mold of FIG. 1E with the bottom portion of the inner core mold raised above the lower section of the outer mold and the bladder expelled off from the inner core mold.

The two primary components of the inner mold core 14 are stacked inside the outer mold 12, with the top portion 32 resting on, and supported by the bottom portion 34, which in turn rests on and is supported by a powered piston 45 (FIG. 1F). The top portion 32 forms the inside surface of the top surface of the mold cavity 16 and the inside surface of the upper "frog eye." The upper bulbous end 37 of the bottom portion 34 forms the remainder of the inside surface of the mold cavity 16.

The top portion 32 of the inner mold core 14 also has a removable handle 38, attached to its top, shown in FIG. 1A in hidden lines, for use in manually removing the top portion 32 after the tire bladder is formed. The lower end 36 of bottom portion 34 has an annular groove or one or more notches 44 formed therein that cooperate with locking mechanism 28 inserted through the bottom section 22 of outer mold 12 for holding the bottom portion 34 in position during the molding process. In addition, the lower end 36 also includes a cooperating first oil path 46, second oil path 48, and oil tray 50 for providing heated oil to the interior 49 of inner mold core 14 thereby heating the mold for forming/curing of the tire bladder. Accordingly, the multi-segmented inner core 14 cooperates with the outer mold 12 to fabricate a tire curing bladder.

A blow off tube 42 is also formed in bottom portion 34. Following formation of the tire bladder, and during the process of removing the finished tire bladder from the mold 10 as detailed below, pressurized air is introduced into the blow off tube 42 to inflate the tire bladder and, thereby, causing it to "blow off" the bottom portion 34.

Referring now to FIGS. 1A through 1F, the steps for forming a tire curing bladder using mold 10 are illustrated. FIG. 1A shows the assembled mold 10, and illustrating the injection of material, such as butyl rubber, into the mold cavity 14 through an injection path 24 by the highlighted arrow 51. Following injection of the tire bladder material, heated oil is introduced into the interior 49 of inner mold core 14 to cause the mold to cure the bladder material as is well known in the art. Referring now to FIG. 1B, the formed tire bladder 52 is shown in the mold cavity 16. The tire bladder includes protrusions 54 that give the bladder 52 a cross-sectional shape with a smaller outer diameter along the central portion 56 and a larger diameter at the respective ends 58. Accordingly, the bladder 52 possesses a distinct geometry known to those skilled in the art as a "frog eye" bladder. Although the "frog eye" bladder has the largest diameters at the ends of the bladder, neither "frog eye" nor the present invention are limited to such a construction For example, a "frog eye" bladder can have protrusions located in other areas of the bladder besides the ends, and such a design is within the principles of the present invention. However, a "frog eye" bladder does not encompass a bladder that tapers from larger diameter to smaller diameter traveling from the centerline towards the ends of the bladder.

The process for removing the bladder 52 is illustrated in FIGS. 1C-1F. The process begins by removing the top section 18 of outer mold 12, which exposes the top portion 32 of the inner mold core 14 removable handle 38 as best shown in FIG. 1C. In addition, the top of the bladder 52 is also exposed. Referring now to FIG. 1D, the top portion 32 is then removed. In the illustrated embodiment, removal of the top portion 32 occurs manually by lifting the top portion by the removable handle 38 off of the bottom portion 34 of the inner mold core 14. Removal of the inner core upper portion 32 exposes additional portions of the bladder 52.

Referring now to FIG. 1E, the middle section 20 of the outer mold 12 is removed next. At this point almost the entire exterior surface of the bladder 52 is exposed and no longer restrained by the outer mold 12. The bladder 52, however, remains adhered to the sides of the inner mold core 14 and must be removed therefrom. As illustrated by FIG. 1F, the locking mechanism 28 is retracted from notch 44 and the bottom portion 34 and bladder 52 are lifted out of the remaining bottom section 22 of the outer mold 12 by piston 45, thereby exposing the remainder of bladder 52. Pressurized air is then introduced to central column 42 of bottom portion 34, which causes the tire bladder to inflate and be "blown off" the bottom portion 34 (i.e. be released from the bottom portion). The tire bladder 52 can then be removed from the bottom portion 32, allowed to cool, and is trimmed and finished prior to sale to the ultimate user.

Figure 2:
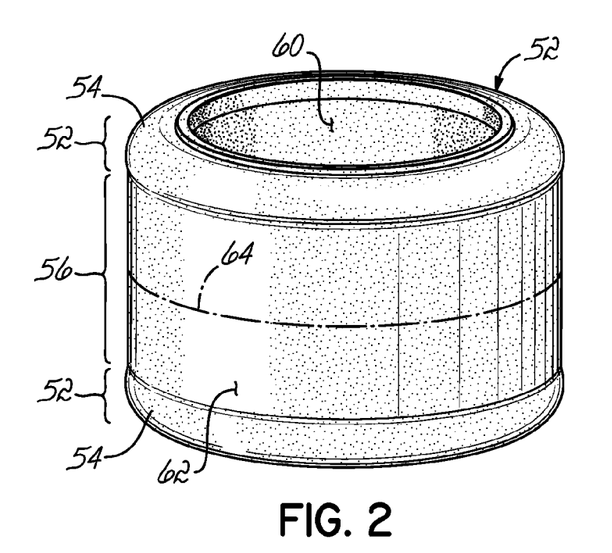
FIG. 2 illustrates a tire bladder formed using the tire bladder forming mold illustrated in FIGS. 1A through 1F.

An example of a finished bladder 52 having an interior surface 60 and exterior surface 62 is shown in FIG. 2. The bladder 52 has a smaller diameter throughout the central portion 56 of the bladder 52 proximal to the centerline 64, and has a larger diameter at the ends of the bladder 52 away from the centerline 60. Bladder 52 has many advantages over the traditional B.O.M. bladders as described earlier.

Figure 3:
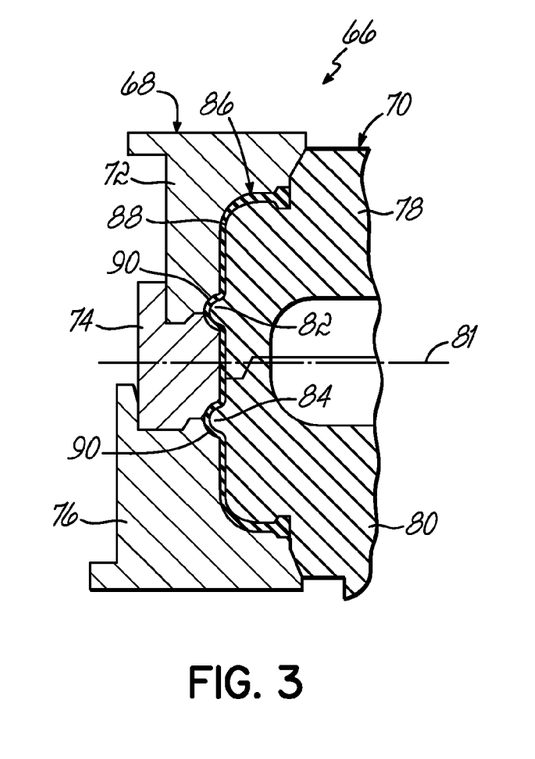
FIG. 3 is a side elevational cross-sectional view of an alternative design of a tire bladder forming mold according to another embodiment of the invention.

FIG. 3 illustrates an alternative embodiment of a mold 66 of the present invention. The mold 66 includes an outer mold 68 and an inner mold core 70, similar to the mold 10 illustrated in FIGS. 1A-1F. In addition, the outer mold 68 similarly has a top section 72, a middle section 74, and a bottom 76 that are stackable and separable from one another as in the embodiment illustrated in FIGS. 1A-1F. The inner core 70, however, has a top portion 78 and a bottom portion 80 in which the top portion 78 extends to about the centerline 81 of the mold cavity 88 rather than near the top of the cavity. In this embodiment, the protrusions 82, 84 are near the centerline 81 of the cavity 88 rather than at the ends. The top portion 78 forms one of the protrusions 82 and the other protrusion 84 is formed by the bottom portion 80. Thus, a tire bladder 86 formed using this alternative mold 66 has two protrusions near the center with a greater diameter than the rest of the tire curing bladder 86. The outer mold 68 and the inner mold core 70 cooperate to form the mold cavity 88 for fabricating the bladder 86.

The invention has been described in the context of exemplary embodiments. Those skilled in the art will appreciate that additions, deletions and modifications to the features described herein may be made without departing from the principles of the present invention. For instance, the inner core upper portion may be automatically removable instead of manually removable. In addition, the use of hot oil inside of the inner core is optional and other types of fluids besides oil and other forms of heating can be used. Alternative systems for restraining the inner mold core besides the illustrated locking mechanism can also be used. Other modifications will be readily apparent to those skilled in this art. Accordingly, the following is claimed:

What is claimed is:

1. A tire curing bladder forming mold assembly comprising:
    an outer mold comprising a plurality of stackable and movable sections, the outer mold including:
        a removable top section;
        a removable middle section for supporting the removable top section when the plurality of sections are stacked; and
        a bottom section for supporting both the removable top section and the removable middle section when the plurality of sections are stacked; and
    an inner mold core enclosed within the outer mold, the inner mold core comprising stackable portions, the inner mold including:
        a removable top portion; and
        a bottom portion for supporting the removable top portion;
    the outer mold and inner mold core cooperating to form a mold cavity therebetween having a centerline, the mold cavity having a diameter away from the centerline thereof that is greater than the diameter at the centerline.

2. The mold of claim 1 wherein the mold cavity has a diameter at symmetric locations spaced from the centerline of the mold cavity greater than the diameter at the centerline of the mold cavity.

3. The mold of claim 1 wherein the mold cavity has a top and a bottom, the diameter of the mold cavity at the top and bottom being greater than the diameter of the centerline of the mold cavity.

4. The mold of claim 1, wherein the removable top section of the outer mold is adapted to be vertically removed from the outer mold.

5. The mold of claim 1, wherein the removable top portion of the inner mold core is adapted to be manually removed.

6. The mold of claim 1, wherein the bottom portion of the inner mold core is adapted to be raised above the bottom section of the outer mold by a power piston.

7. A mold for fabricating bladders having a diameter at a position spaced from the centerline of the bladder that is greater than the diameter of the bladder at the centerline comprising:
    a three component outer mold;
    a two component inner mold core enclosed by said outer mold;
    the outer mold and the inner mold core defining a mold cavity therebetween, wherein the mold cavity has a generally torodial shape having a larger diameter at the upper and lower ends of the mold cavity than a diameter at a centerline of the mold cavity.

8. The mold of claim 7 wherein the three component outer mold includes a removable top section, a removable middle section for supporting the removable top section during fabrication of a bladder, and a bottom section for supporting both the removable top section and the removable middle section during fabrication of a bladder.

9. The mold of claim 7 wherein the two-component inner mold core includes a removable top portion and a bottom portion.

10. The mold of claim 9 wherein the removable top portion of the inner mold core is adapted to be manually removed.

11. The mold of claim 9 wherein the bottom portion includes a channel for transmitting pressurized air.

* * * * *